US012707014B2

(12) United States Patent
Kawano

(10) Patent No.: US 12,707,014 B2
(45) Date of Patent: Aug. 11, 2026

(54) ELECTRONIC DEVICE, METHOD FOR CONTROLLING ELECTRONIC DEVICE, AND IMAGE FORMING APPARATUS

(71) Applicant: SEIKO EPSON CORPORATION, Tokyo (JP)

(72) Inventor: Yo Kawano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 319 days.

(21) Appl. No.: 18/616,416

(22) Filed: Mar. 26, 2024

(65) Prior Publication Data

US 2024/0333855 A1 Oct. 3, 2024

(30) Foreign Application Priority Data

Mar. 29, 2023 (JP) ................................ 2023-052914

(51) Int. Cl.
*H04N 1/32* (2006.01)
*H04N 1/00* (2006.01)

(52) U.S. Cl.
CPC ..... *H04N 1/32625* (2013.01); *H04N 1/00037* (2013.01); *H04N 1/00058* (2013.01); *H04N 1/0009* (2013.01); *H04N 1/32694* (2013.01); *H04N 2201/0094* (2013.01)

(58) Field of Classification Search
USPC ........................................................ 358/1.13
See application file for complete search history.

(56) References Cited

U.S. PATENT DOCUMENTS

2020/0068076 A1* 2/2020 Koehler ................. B41J 29/393

FOREIGN PATENT DOCUMENTS

JP 2020-157486 A 10/2020

* cited by examiner

*Primary Examiner* — Jacky X Zheng
(74) *Attorney, Agent, or Firm* — WORKMAN NYDEGGER

(57) ABSTRACT

A multifunction peripheral includes: a failure detection unit configured to detect a failure that occurs in a plurality of driven units; and a candidate extraction unit configured to collate, when the failure is detected, audio collection data collected by an audio collection unit with failure audio data and extract a first candidate for a component that causes the failure, to specify a component in a driven state immediately before the failure occurs based on operation history and correspondence data and extract the specified component as a second candidate for the component that causes the failure, and to set a candidate for the component that causes the failure based on the component extracted as the first candidate and the component extracted as the second candidate.

9 Claims, 3 Drawing Sheets

ELECTRONIC DEVICE, METHOD FOR CONTROLLING ELECTRONIC DEVICE, AND IMAGE FORMING APPARATUS

The present application is based on, and claims priority from JP Application Serial Number 2023-052914, filed Mar. 29, 2023, the disclosure of which is hereby incorporated by reference herein in its entirety.

BACKGROUND

1. Technical Field

The present disclosure relates to an electronic device, a method for controlling the electronic device, and an image forming apparatus.

2. Related Art

In related art, there is known a method for specifying a position where a failure occurs in an electronic device based on operation audio of the electronic device.

For example, JP-A-2020-157486 discloses an image recording apparatus in which a controller is operated as an inspection determination unit, an audio collection notification unit, an execution unit, and an abnormality determination unit. The inspection determination unit determines whether inspection on a driven unit is required. The audio collection notification unit issues a notification to prompt an external terminal to collect operation audio of the image recording apparatus when there is a specific driven unit that is determined by the inspection determination unit to require inspection. The execution unit executes an inspection mode including processing of driving the specific driven unit after the notification is issued by the audio collection notification unit. The abnormality determination unit determines whether there is an abnormality in the specific driven part based on audio collection data generated by the external terminal.

JP-A-2020-157486 is an example of the related art.

The image recording apparatus disclosed in JP-A-2020-157486 determines whether there is an abnormality in a specific driven part based on audio collection data generated by the external terminal, but cannot predict a failed component, and thus it is not possible to perform appropriate repair at the time of on-site repair, and it takes time to restore the image recording apparatus.

SUMMARY

The present disclosure relates to an electronic device including: an audio collection unit; an operation unit configured to receive an operation; a plurality of driven units; a storage unit configured to store correspondence data associating the operation received by the operation unit with a component of the driven unit that is driven when the operation is received, an operation history that is a history of the operation received by the operation unit, and failure audio data recording failure audio generated when the plurality of driven units are driven; a failure detection unit configured to detect a failure that occurs in the plurality of driven units; and a candidate extraction unit configured to collate, when the failure detection unit detects the failure, audio collection data collected by the audio collection unit with the failure audio data, and extract a first candidate for a component that causes the failure, specify a component in a driven state immediately before the failure occurs based on the operation history and the correspondence data, and extract the specified component as a second candidate for the component that causes the failure, and set a candidate for the component that causes the failure based on the component extracted as the first candidate and the component extracted as the second candidate.

The present disclosure relates to a method for controlling an electronic device including a plurality of driven units, and the method includes: detecting a failure that occurs in the plurality of driven units; collating, when the failure is detected, audio collection data collected by an audio collection unit provided in the electronic device with failure audio data recording failure audio generated when the plurality of driven units are driven, and extracting a first candidate for a component that causes the failure; specifying a component in a driven state immediately before the failure occurs based on correspondence data, the correspondence data associating an operation received by an operation unit provided in the electronic device with a component of the driven unit that is driven when the operation is received, and an operation history that is a history of the operation received by the operation unit, and extracting the specified component as a second candidate for the component that causes the failure; and setting a candidate for the component that causes the failure based on the component extracted as the first candidate and the component extracted as the second candidate.

The present disclosure relates to an image forming apparatus including: an audio collection unit; an operation unit configured to receive an operation; a plurality of driven units; a storage unit configured to store correspondence data associating the operation received by the operation unit with a component of the driven unit that is driven when the operation is received, an operation history that is a history of the operation received by the operation unit, and failure audio data recording failure audio generated when the plurality of driven units are driven; a failure detection unit configured to detect a failure that occurs in the plurality of driven units; and a candidate extraction unit configured to collate, when the failure detection unit detects the failure, audio collection data collected by the audio collection unit with the failure audio data and extract a first candidate for a component that causes the failure, specify a component in a driven state immediately before the failure occurs based on the operation history and the correspondence data and extract the specified component as a second candidate for the component that causes the failure, and set a candidate for the component that causes the failure based on the component extracted as the first candidate and the component extracted as the second candidate.

DESCRIPTION OF EMBODIMENTS

Hereinafter, an embodiment will be described with reference to the accompanying drawings.

1. Configuration of Multifunction Peripheral

Figure 1:
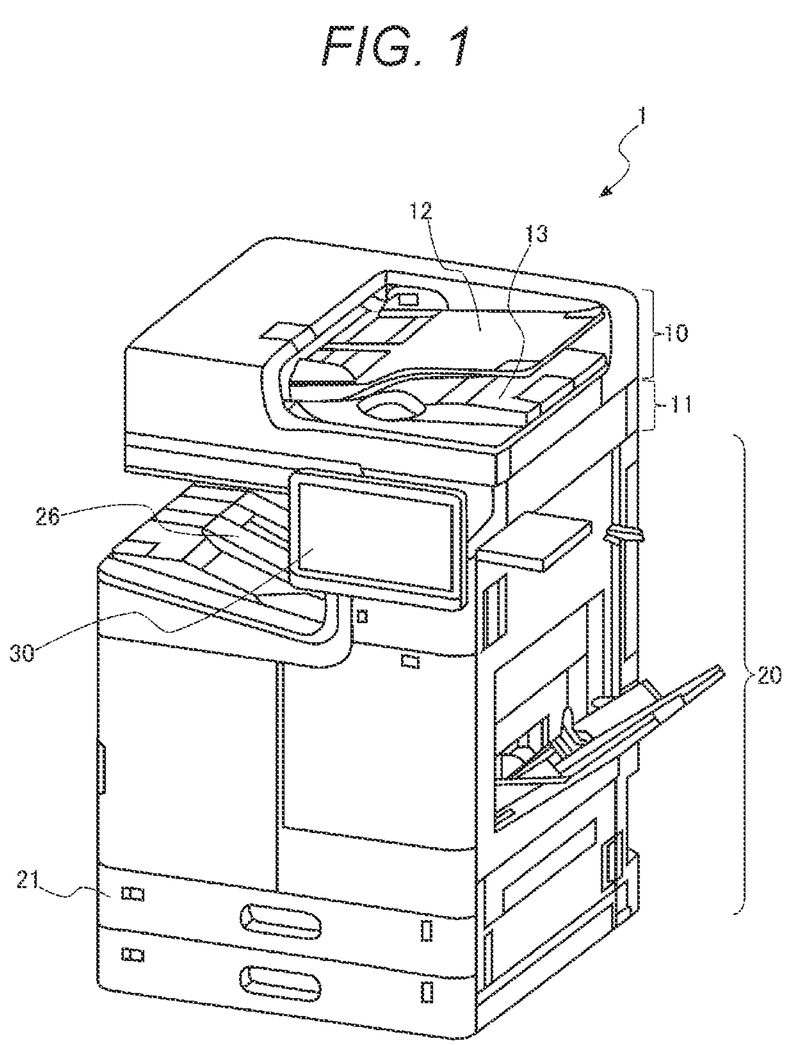
FIG. 1 is a perspective view showing a configuration of a multifunction peripheral.

FIG. 1 is a perspective view showing an appearance of a multifunction peripheral 1. The multifunction peripheral 1 corresponds to an example of an electronic device and an image forming apparatus. The multifunction peripheral 1 includes a reading unit 10 that reads a document, a printing unit 20 that performs printing, and a touch panel 30. The reading unit 10 and the printing unit 20 correspond to a driven unit.

The multifunction peripheral 1 has a printing function of printing on a medium and a copy function of reading an image of a document to generate image data and printing the generated image data on a printing medium. The multifunction peripheral 1 has a scanning function of reading an image of a document to generate image data and storing the generated image data in a storage unit or the like of the multifunction peripheral 1. Further, the multifunction peripheral 1 may additionally have a fax function of faxing image data generated by reading an image of a document or externally received data.

The reading unit 10 is placed on a reading unit placement table 11. The reading unit 10 includes a placement tray 12 on which a document is placed and a document discharge tray 13 to which the document conveyed along a conveyance path (not shown) is discharged. The reading unit 10 conveys the document placed on the placement tray 12 along the conveyance path and discharges the document to the document discharge tray 13. A reading sensor 14 is provided on the conveyance path of the reading unit 10. The reading sensor 14 reads an image formed on a document.

The reading unit placement table 11 is a unit that relays between the reading unit 10 and the printing unit 20, and a microphone provided in an audio collection unit 50 to be described later is mounted on the reading unit placement table 11. The reading unit placement table 11 corresponds to a relay member. A configuration in which the audio collection unit 50 is provided in the reading unit placement table 11 is described in the embodiment, but the audio collection unit 50 may be provided in each of the reading unit 10 and the printing unit 20.

The printing unit 20 includes a paper feed portion 21 that accommodates a printing medium, and a conveyance portion 22 that conveys the printing medium accommodated in the paper feed portion 21. The printing unit 20 includes an ink cartridge 23 that accommodates ink, and a printing head 24 that ejects the ink supplied from the ink cartridge 23 onto the printing medium to print an image on the printing medium. The printing unit 20 further includes a carriage 25 on which the ink cartridge 23 and the printing head 24 are mounted and that moves the ink cartridge 23 and the printing head 24 in a main scanning direction, and a medium discharge tray 26 to which the printing medium is discharged. The printing unit 20 may employ an electrophotographic system in which an electrostatic latent image formed on a photosensitive drum is developed with a developer, and the developer image on the photosensitive drum is transferred to a printing medium.

The touch panel 30 corresponds to an operation unit and includes a display panel 31 and a touch sensor 33.

For example, a liquid crystal panel or an organic electroluminescence (EL) panel is used as the display panel 31. The touch sensor 33 detects a touch operation of a user on the display panel 31. When the touch sensor 33 detects the touch operation, the touch sensor 33 outputs information indicating a position of the detected touch operation to a control unit 100 to be described later. A coordinate system is preset on the display panel 31, and when detecting the touch operation, the touch sensor 33 outputs coordinates indicating the position of the touch operation in the coordinate system to the control unit 100 as information indicating the position.

Figure 2:
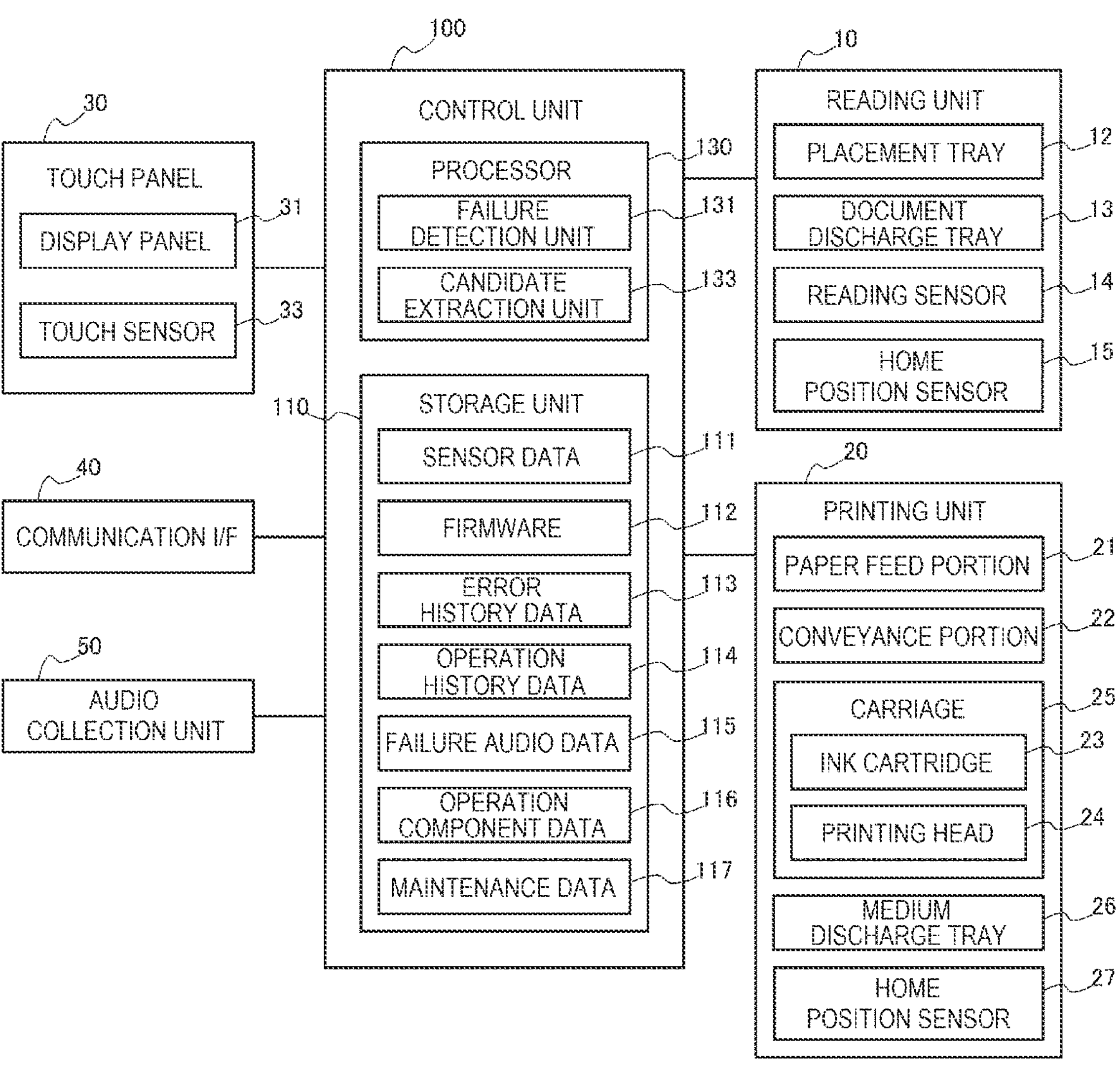
FIG. 2 is a functional block diagram of the multifunction peripheral.

FIG. 2 is a functional block diagram of the multifunction peripheral 1.

The multifunction peripheral 1 includes the reading unit 10, the printing unit 20, the touch panel 30, a communication interface 40, the audio collection unit 50, and the control unit 100. Hereinafter, the interface is abbreviated as an I/F.

The reading unit 10 includes, in addition to the placement tray 12, the document discharge tray 13, and the reading sensor 14, a home position sensor 15 that detects an operation abnormality of a plurality of components provided in the reading unit 10. For simplicity of illustration, FIG. 2 shows only one home position sensor 15, but the reading unit 10 includes a plurality of home position sensors 15. The home position sensor 15 detects whether a target component is at a preset position corresponding to an operation of the reading unit 10. The home position sensor 15 outputs sensor data indicating a detection result to the control unit 100. The home position sensor 15 corresponds to a position detection unit.

The printing unit 20 includes a home position sensor 27 that detects an operation abnormality of a plurality of components provided in the printing unit 20. For simplicity of illustration, FIG. 2 shows only one home position sensor 27, but the printing unit 20 includes a plurality of home position sensors 27. The home position sensor 27 detects whether a target component is at a preset position corresponding to an operation of the printing unit 20. The home position sensor 27 outputs sensor data indicating a detection result to the control unit 100. The home position sensor 27 corresponds to a position detection unit.

The communication I/F 40 includes a connector and an interface circuit, and is wire-connected to a network. The communication I/F 40 includes, for example, a network interface card (NIC). A mode in which the communication I/F 40 is connected to the network by wire will be described in the embodiment, but the connecting mode of the communication I/F 40 to the network may be wireless.

The audio collection unit 50 includes the microphone and an audio processing unit. The microphone and the audio processing unit are not shown. The audio collection unit 50 converts analog audio data received from the microphone into a digital format using the audio processing unit according to an instruction of the control unit 100. The audio collection unit 50 outputs the converted digital audio data to the control unit 100.

The control unit 100 is a computer including a storage unit 110 and a processor 130.

The storage unit 110 includes a volatile memory and a nonvolatile memory.

The volatile memory includes, for example, a random access memory (RAM).

The nonvolatile memory includes, for example, a read-only memory (ROM), a flash memory, and an electrically erasable programmable read-only memory (EEPROM).

The volatile memory is used as a calculation area for the processor 130. The volatile memory stores sensor data 111 output from the home position sensors 15 and 27 and a plurality of sensors (not shown) mounted on the multifunction peripheral 1.

The nonvolatile memory stores firmware 112, error history data 113, operation history data 114, failure audio data 115, operation component data 116, and maintenance data 117.

The firmware 112 is a control program executed by the processor 130.

The error history data 113 is data recording a failure code indicating a type of a failure detected by the control unit 100 based on the sensor data 111.

The operation history data 114 is data recording a history of operations input by the user through the touch panel 30.

The failure audio data 115 is data recording failure audio that is audio detected when a failure occurs in a component provided in the reading unit 10 or the printing unit 20. The multifunction peripheral 1 stores, as the failure audio data 115, audio detected when a failure occurs, for each of main components provided in the reading unit 10 and the printing unit 20.

The operation component data 116 is data registering, in association with each other, processing to be executed by the multifunction peripheral 1 and a component that operates during execution of the processing.

The maintenance data 117 is data registering, in association with each other, a previous replacement date of a component and replacement reference time of the component. The replacement reference time may be indicated by days and years, or the number of printed sheets. The maintenance data 117 corresponds to maintenance information.

The processor 130 is a calculation processing device including a processor such as a central processing unit (CPU) or a micro-processing unit (MPU). The processor 130 can be implemented by a single processor, or a plurality of processors. The processor 130 may be implemented by a system-on-a-chip (SoC) integrated with a part of or the whole storage unit 110 and other circuits. The processor 130 may be implemented by a combination of a CPU that executes a program and a digital signal processor (DSP) that executes predetermined calculation processing. Further, the processor 130 may be configured such that all functions of the processor 130 are implemented in hardware, or may be implemented using a programmable device.

2. Operation of Multifunction Peripheral

The control unit 100 includes a failure detection unit 131 and a candidate extraction unit 133 as functional blocks. The functional blocks are functions implemented by the processor 130 executing calculations according to the firmware 112.

The failure detection unit 131 detects a failure in the multifunction peripheral 1. The failure detection unit 131 detects the occurred failure in the multifunction peripheral 1 based on the sensor data 111 received from various sensors mounted on the multifunction peripheral 1. The failure detection unit 131 records a failure code indicating a type of the detected failure in the error history data 113.

When the failure in the multifunction peripheral 1 is detected by the failure detection unit 131, the candidate extraction unit 133 extracts a candidate for a component in which the failure occurs. The candidate extraction unit 133 extracts the candidate for the component that finally causes the failure by executing first detection processing, second detection processing, third detection processing, and fourth detection processing.

The first detection processing is processing of detecting a component in which a failure occurs by collating audio data received from the audio collection unit 50 with the failure audio data 115 stored in the storage unit 110. The candidate extraction unit 133 detects a waveform of failure audio closest to a waveform of the audio data received from the audio collection unit 50, and sets the component corresponding to the detected failure audio as a first temporary candidate component. The first temporary candidate component corresponds to a first candidate for the component that causes the failure.

The first detection processing is processing of detecting the component in which the failure occurs based on a failure code indicating a type of the failure recorded in the error history data 113. The candidate extraction unit 133 sets the detected component as the first temporary candidate component.

The candidate extraction unit 133 may set, as the first temporary candidate component, a component common to a component detected by collating the audio data received from the audio collection unit 50 with the failure audio data 115 and a component detected based on the error history data 113. When there is no common component, the candidate extraction unit 133 may set, as the first temporary candidate component, both the component detected by collating the audio data received from the audio collection unit 50 with the failure audio data 115 and the component detected based on the error history data 113.

The second detection processing is processing of specifying a component that is being driven immediately before a failure occurs and setting the specified component as a second candidate component. The candidate extraction unit 133 refers to the operation history data 114 and specifies an operation input by the user immediately before the failure in the multifunction peripheral 1 occurs. Next, the candidate extraction unit 133 refers to the operation component data 116 and detects the component that is being driven due to the specified operation. The candidate extraction unit 133 sets the detected component as a second temporary candidate component. The second temporary candidate component corresponds to a second candidate for the component that causes the failure.

In the third detection processing, a component in which a failure occurs is detected based on detection results of the plurality of home position sensors 15 and 27 provided in the reading unit 10 and the printing unit 20. When the component in which the failure occurs is detected, the candidate extraction unit 133 determines whether the detected component is included in the first temporary candidate component or the second temporary candidate component. When the detected component is included in the first temporary candidate component or the second temporary candidate component, the candidate extraction unit 133 sets the component as a failure candidate that is a candidate for the failed component.

The fourth detection processing is processing of determining whether an occurred failure is a failure that suddenly occurs or a failure that occurs due to wear and tear of a consumable, and detecting a candidate for the component in which the failure occurs based on a determination result. Hereinafter, the failure that suddenly occurs is referred to as an unexpected failure, and the failure that occurs due to wear and tear of the consumable is referred to as a wear-out failure.

First, the candidate extraction unit 133 determines whether an occurred failure is an unexpected failure or a wear-out failure.

The candidate extraction unit 133 determines whether the occurred failure is the unexpected failure based on the error history data 113 and the operation history data 114.

For example, when occurrence of a paper jam is recorded in the error history data 113 immediately before a failure occurs, and a fact that the user performs a repair operation for solving the occurred paper jam is recorded in the operation history data 114, the candidate extraction unit 133 determines that an unexpected failure occurs. In this case, in order to solve the paper jam, for example, it is highly possible that the user pulls paper jammed forcibly and the component fails.

When determining that the occurred failure is the unexpected failure, the candidate extraction unit 133 detects a component in which the failure occurs based on the error history data 113. For example, when the paper jam is recorded in the error history data 113, the candidate extraction unit 133 detects the component in which the failure occurs based on a position where the paper jam occurs.

When determining that no unexpected failure occurs, the candidate extraction unit 133 compares elapsed time from a previous replacement date with replacement reference time recorded in the maintenance data 117, and detects a component in which a difference with the replacement reference time is within a preset range.

When a component is detected in the third detection processing or the fourth detection processing, the candidate extraction unit 133 determines whether the detected component is included in the first temporary candidate component or the second temporary candidate component. When the detected component is included in the first temporary candidate component or the second temporary candidate component, the candidate extraction unit 133 sets the component as a failure candidate that is a candidate for the failed component.

When the component detected in the third detection processing and the fourth detection processing is not included in the first temporary candidate component and the second temporary candidate component, the candidate extraction unit 133 sets the first temporary candidate component, the second temporary candidate component, and the component detected in the third detection processing and the fourth detection processing as failure candidates.

Figure 3:
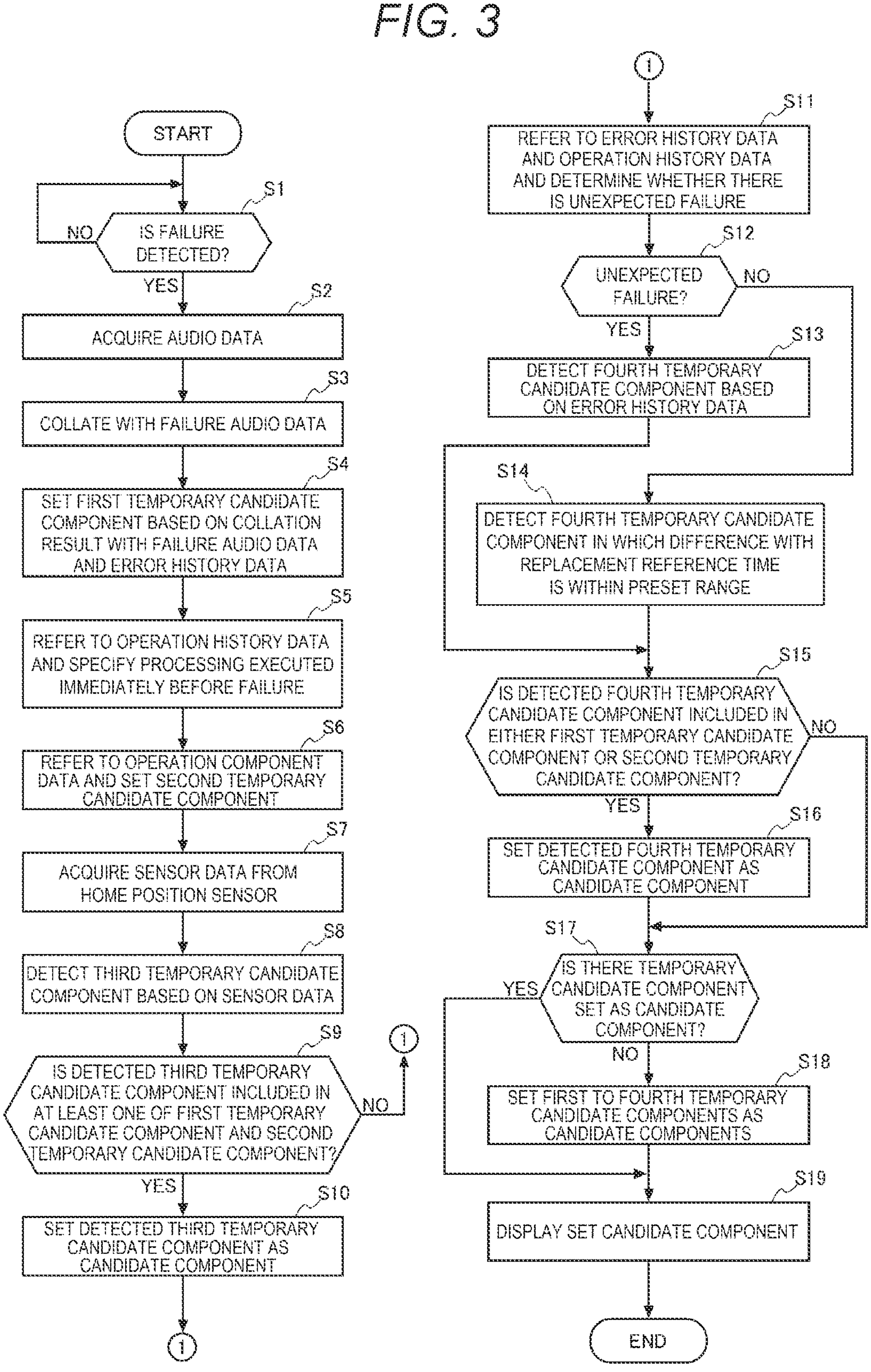
FIG. 3 is a flowchart showing an operation of the multifunction peripheral.

FIG. 3 is a flowchart showing an operation of the multifunction peripheral 1.

The operation of the multifunction peripheral 1 will be described with reference to the flowchart shown in FIG. 3.

First, the control unit 100 determines whether a failure in the multifunction peripheral 1 is detected (step S1). The control unit 100 detects the failure that occurs in the multifunction peripheral 1 based on sensor data received from various sensors mounted on the multifunction peripheral 1.

When no failure in the multifunction peripheral 1 is detected (step S1/NO), the control unit 100 waits until a failure is detected. When detecting the failure in the multifunction peripheral 1 (step S1/YES), the control unit 100 acquires audio data from the storage unit 110 (step S2). The audio data is data obtained by temporarily storing audio data received from the audio collection unit 50 in the storage unit 110.

Next, the control unit 100 collates the acquired audio data with the failure audio data 115 (step S3), and detects a component in which the failure occurs.

Next, the control unit 100 detects a first temporary candidate component based on the error history data 113 and a result of collation between the audio data and the failure audio data 115 (step S4). For example, the control unit 100 detects, as the first temporary candidate component, a component common to a component detected based on the collation result and a component detected based on the error history data 113. When there is no component common to the component detected based on the comparison result and the component detected based on the error history data 113, the control unit 100 sets, as the first temporary candidate components, both the component detected based on the collation result and the component detected based on the error history data 113.

Next, the control unit 100 refers to the operation history data 114 and specifies processing executed immediately before occurrence of the failure (step S5). Then, the control unit 100 refers to the operation component data 116 and sets a component to be driven during execution of the specified processing as a second temporary candidate component (step S6).

Next, the control unit 100 acquires sensor data from the home position sensors 15 and 27 (step S7), and detects a third temporary candidate component based on the acquired sensor data (step S8). The control unit 100 determines whether the sensor data from the home position sensors 15 and 27 indicates an error, and when the sensor data indicates the error, sets the third temporary candidate component based on the home position sensors 15 and 27 that indicate the error.

Next, the control unit 100 determines whether the detected third temporary candidate component is included in at least one of the first temporary candidate component and the second temporary candidate component (step S9). When the detected component is included in at least one of the first temporary candidate component and the second temporary candidate component (step S9/YES), the control unit 100 sets the detected third temporary candidate component as a candidate component (step S10) and proceeds to the processing in step S11.

When the detected third temporary candidate component is not included in at least one of the first temporary candidate component and the second temporary candidate component (step S9/NO), the control unit 100 proceeds to the processing in step S11.

Next, the control unit 100 refers to the error history data 113 and the operation history data 114, and determines whether the occurred failure is an unexpected failure (step S11). When occurrence of a paper jam is recorded in the error history data 113 immediately before a failure occurs, and a fact that the user resolves the occurred paper jam is recorded in the operation history data 114, the control unit 100 determines that the occurred failure is an unexpected failure.

When determining that the occurred failure is the unexpected failure (step S12/YES), the control unit 100 detects a fourth temporary candidate component based on the error history data 113 (step S13). When the paper jam is included in the error history data 113, the control unit 100 detects the fourth temporary candidate component based on a position where the paper jam occurs.

When determining that the occurred failure is not the unexpected failure (step S12/NO), the control unit 100 compares elapsed time from a previous replacement date with replacement reference time recorded in the maintenance data 117. The control unit 100 detects the fourth temporary candidate component in which a difference between the elapsed time from the previous replacement date and the replacement reference time is within a preset range (step S14).

Next, the control unit 100 determines whether the fourth temporary candidate component detected in step S13 or S14 is included in at least one of the first temporary candidate component and the second temporary candidate component (step S15). When the detected fourth temporary candidate component is included in at least one of the first temporary candidate component and the second temporary candidate component (step S15/YES), the control unit 100 sets the detected fourth temporary candidate component as a candidate component (step S16), and proceeds to the determination in step S17.

When the detected component is not included in at least one of the first temporary candidate component and the second temporary candidate component (step S15/NO), the control unit 100 proceeds to the determination in step S17.

Next, the control unit 100 determines whether there is a component set as a candidate component (step S17) In at least one of steps S10 and S16, the control unit 100 determines whether there is a component set as a candidate component.

When there is the component set as the candidate component (step S17/YES), the control unit 100 displays the set candidate component on the touch panel 30 (step S19).

When there is no component set as the candidate component (step S17/NO), the control unit 100 sets, as candidate components, the first temporary candidate component, the second temporary candidate component, the third temporary candidate component, and the fourth temporary candidate component (step S18). The control unit 100 displays the set candidate components on the touch panel 30.

3. Other Embodiments

The above-described embodiment is a preferred embodiment of the present disclosure. However, the present disclosure is not limited to the above-described embodiment, and various modifications can be made without departing from the gist of the present disclosure.

For example, after the first temporary candidate component and the second temporary candidate component are extracted, a component that causes the failure is further detected in the third detection processing and the fourth detection processing in the above-described embodiment, but the first temporary candidate component and the second temporary candidate component may be displayed on the touch panel 30 as candidate components.

Functional units of the multifunction peripheral 1 shown in FIG. 2 indicate a functional configuration, and a specific implementation form is not particularly limited. That is, there is no need to mount hardware corresponding to each functional unit, and it is also possible to implement a configuration in which one or a plurality of processors execute programs to implement functions of a plurality of functional units. In the above-described embodiment, a part of functions implemented by software may be implemented by hardware, or a part of functions implemented by hardware may be implemented by software. In addition, specific detailed configurations of other units of the multifunction peripheral 1 can be changed as desired without departing from the gist of the present disclosure.

Processing units in the flowchart shown in FIG. 3 are divided according to main processing contents in order to facilitate understanding of the processing by the multifunction peripheral 1. The present disclosure is not limited by a way of dividing the processing units and names shown in the flowchart in FIG. 3. The processing by the multifunction peripheral 1 can be divided into more processing units according to the processing contents, or one processing unit can be divided to include more processing. A processing order in the flowchart as well is not limited to the shown example.

When implementing a method for controlling an electronic device by a computer provided in the multifunction peripheral 1, it is also possible to configure a program to be executed by the computer in a form of a recording medium or a transmission medium that transmits the program. A magnetic or optical recording medium, or a semiconductor memory device can be used as the recording medium. Specific examples include a portable or fixed recording medium such as a flexible disk, a hard disk drive (HDD), a CD-ROM, a DVD, a Blu-ray Disc, a magneto-optical disk, a flash memory, and a card type recording medium. Blu-ray is a registered trademark.

Although the multifunction peripheral 1 has been described as an example of the electronic device in the embodiment, the electronic device may be, for example, a printer, a facsimile apparatus, a scanner, or a personal computer.

The control unit 100 may transmit information related to the first temporary candidate component, the second temporary candidate component, the third temporary candidate component, the fourth temporary candidate component, and the set candidate component to at least one of a manufacturer of the electronic device and a maintenance company of the electronic device. A transmission method is not particularly limited, and examples thereof include mail delivery or transmission via a network to a server of at least one of the manufacturer of the electronic device and the maintenance company of the electronic device.

4. Summary of Present Disclosure

Hereinafter, a summary of the present disclosure will be appended.

APPENDIX 1

An electronic device includes:

an audio collection unit;

an operation unit configured to receive an operation;

a plurality of driven units;

a storage unit configured to store correspondence data associating the operation received by the operation unit with a component of the driven unit that is driven when the operation is received, an operation history that is a history of the operation received by the operation unit, and failure audio data recording failure audio generated when the plurality of driven units are driven;

a failure detection unit configured to detect a failure that occurs in the plurality of driven units; and a candidate extraction unit configured to collate, when the failure detection unit detects the failure, audio collection data collected by the audio collection unit with the failure audio data, and extract a first candidate for a component that causes the failure, specify a component in a driven state immediately before the failure occurs based on the operation history and the correspondence data, and extract the specified component as a second candidate for the component that causes the failure, and set a candidate for the component that causes the failure based on the component extracted as the first candidate and the component extracted as the second candidate.

According to this configuration, the audio collection data from the audio collection unit is collated with the failure audio data, the first candidate for the component that causes the failure is extracted, and the component in the driven state immediately before the failure occurs is extracted as the second candidate for the component that causes the failure.

Therefore, the component that causes the failure can be extracted, and time required to restore the electronic device can be shortened.

APPENDIX 2

The electronic device according to Appendix 1 further includes: a plurality of position detection units configured to detect positions of a plurality of components mounted on the plurality of driven units. The candidate extraction unit determines whether each component is at a preset position corresponding to an operation of the driven unit on which the component is mounted, based on detection results of the plurality of position detection units, and when a component that is not at the preset position is included in the component extracted as the first candidate or the second candidate, sets the component that is not at the preset position as the candidate for the component that causes the failure.

According to this configuration, the component that causes the failure is extracted based on the detection result of the position detection unit. Therefore, a component that is not at a normal position can be set as the candidate for the component that causes the failure.

APPENDIX 3

In the electronic device according to Appendix 1 or 2, the storage unit stores a failure code for identifying the failure detected by the failure detection unit, and the candidate extraction unit determines whether the failure detected by the failure detection unit is an unexpected failure caused by a repair operation performed on the electronic device by a user, based on an operation history and the failure code.

According to this configuration, it is determined whether the failure detected by the failure detection unit is the unexpected failure caused by the repair operation performed on the electronic device by the user, based on the operation history and the failure code. Therefore, accuracy of extracting the component that causes the failure can be improved.

APPENDIX 4

In the electronic device according to Appendix 3, the candidate extraction unit extracts the component that causes the failure based on the failure code when determining that the failure detected by the failure detection unit is the unexpected failure, and sets the extracted component as the candidate for the component that causes the failure when the extracted component is included in the component extracted as the first candidate or the second candidate.

According to this configuration, when the failure detected by the failure detection unit is the unexpected failure, the component that causes the failure is extracted based on the failure code. Therefore, when the failure is the unexpected failure caused by the repair operation performed on the electronic device by the user, accuracy of extracting the component that causes the failure can be improved.

APPENDIX 5

In the electronic device according to Appendix 3 or 4, the storage unit stores the maintenance information including a replacement date on which the plurality of components provided in the plurality of driven units are replaced and reference replacement time of the plurality of components, and the candidate extraction unit extracts a component in which a difference between elapsed time from a previous replacement date and the reference replacement time is within a preset range based on the maintenance information when determining that the failure detected by the failure detection unit is not the unexpected failure, and sets the extracted component as the candidate of the component that causes the failure when the extracted component is included in the component extracted as the first candidate or the second candidate.

According to this configuration, when the failure detected by the failure detection unit is not the unexpected failure, the component in which the difference between the elapsed time from the previous replacement date and the reference replacement time is within the preset range is extracted based on the maintenance information. When the failure is not the unexpected failure caused by the repair operation performed on the electronic device by the user, accuracy of extracting the component that causes the failure can be improved.

APPENDIX 6

The electronic device according to any one of Appendixes 1 to 5, further includes: a plurality of the audio collection units. The plurality of the audio collection units are provided in the plurality of driven units, respectively.

According to this configuration, the audio collection unit can be disposed closer to the component in which the failure occurs, and accuracy of the collected audio collection data can be improved.

APPENDIX 7

A method for controlling an electronic device including a plurality of driven units includes:

detecting a failure that occurs in the plurality of driven units;

collating, when the failure is detected, audio collection data collected by an audio collection unit provided in the electronic device with failure audio data recording failure audio generated when the plurality of driven units are driven, and extracting a first candidate for a component that causes the failure;

specifying a component in a driven state immediately before the failure occurs based on correspondence data, the correspondence data associating an operation received by an operation unit provided in the electronic device with a component of the driven unit that is driven when the operation is received, and an operation history that is a history of the operation received by the operation unit, and extracting the specified component as a second candidate for the component that causes the failure; and setting a candidate for the component that causes the failure based on the component extracted as the first candidate and the component extracted as the second candidate.

According to this configuration, the audio collection data from the audio collection unit is collated with the failure audio data, the first candidate for the component that causes the failure is extracted, and the component in the driven state immediately before the failure occurs is extracted as the second candidate for the component that causes the failure. Therefore, the component that causes the failure can be extracted, and time required to restore the electronic device can be shortened.

APPENDIX 8

An image forming apparatus includes:

an audio collection unit;

an operation unit configured to receive an operation;

a plurality of driven units;

a storage unit configured to store correspondence data associating the operation received by the operation unit with a component of the driven unit that is driven when the operation is received, an operation history that is a history of the operation received by the operation unit, and failure audio data recording failure audio generated when the plurality of driven units are driven;

a failure detection unit configured to detect a failure that occurs in the plurality of driven units; and a candidate extraction unit configured to collate, when the failure detection unit detects the failure, audio collection data collected by the audio collection unit with the failure audio data, and extract a first candidate for a component that causes the failure, specify a component in a driven state immediately before the failure occurs based on the operation history and the correspondence data, and extract the specified component as a second candidate for the component that causes the failure, and set a candidate for the component that causes the failure based on the component extracted as the first candidate and the component extracted as the second candidate.

According to this configuration, the audio collection data from the audio collection unit is collated with the failure audio data, the first candidate for the component that causes the failure is extracted, and the component in the driven state immediately before the failure occurs is extracted as the second candidate for the component that causes the failure. Therefore, the component that causes the failure can be extracted, and time required to restore the electronic device can be shortened.

APPENDIX 9

In the image forming apparatus according to Appendix 8, the audio collection unit is provided at a relay member disposed between a reading unit and a printing unit provided in the plurality of driven units.

According to this configuration, the audio data can be generated by collecting audio generated in the reading unit and the printing unit by the audio collection unit.

What is claimed is:

1. An electronic device comprising:

an audio collection unit;

an operation unit configured to receive an operation;

a plurality of driven units;

a storage unit configured to store correspondence data associating the operation received by the operation unit with a component of the driven unit that is driven when the operation is received, an operation history that is a history of the operation received by the operation unit, and failure audio data recording failure audio generated when the plurality of driven units are driven;

a failure detection unit configured to detect a failure that occurs in the plurality of driven units; and a candidate extraction unit configured to collate, when the failure detection unit detects the failure, audio collection data collected by the audio collection unit with the failure audio data, and extract a first candidate for a component that causes the failure, specify a component in a driven state immediately before the failure occurs based on the operation history and the correspondence data, and extract the specified component as a second candidate for the component that causes the failure, and set a candidate for the component that causes the failure based on the component extracted as the first candidate and the component extracted as the second candidate.

2. The electronic device according to claim 1, further comprising:

a plurality of position detection units configured to detect positions of a plurality of components mounted on the plurality of driven units, wherein the candidate extraction unit determines whether each component is at a preset position corresponding to an operation of the driven unit on which the component is mounted, based on detection results of the plurality of position detection units, and when a component that is not at the preset position is included in the component extracted as the first candidate or the second candidate, sets the component that is not at the preset position as the candidate for the component that causes the failure.

3. The electronic device according to claim 2, wherein the storage unit stores a failure code for identifying the failure detected by the failure detection unit, and the candidate extraction unit determines whether the failure detected by the failure detection unit is an unexpected failure caused by a repair operation performed on the electronic device by a user, based on an operation history and the failure code.

4. The electronic device according to claim 3, wherein the candidate extraction unit extracts the component that causes the failure based on the failure code when determining that the failure detected by the failure detection unit is the unexpected failure, and sets the extracted component as the candidate for the component that causes the failure when the extracted component is included in the component extracted as the first candidate or the second candidate.

5. The electronic device according to claim 3, wherein the storage unit stores maintenance information including a replacement date on which the plurality of components provided in the plurality of driven units are replaced and a reference replacement time of the plurality of components, and the candidate extraction unit extracts a component in which a difference between elapsed time from a previous replacement date and the reference replacement time is within a preset range based on the maintenance information when determining that the failure detected by the failure detection unit is not the unexpected failure, and sets the extracted component as the candidate of the component that causes the failure when the extracted component is included in the component extracted as the first candidate or the second candidate.

6. The electronic device according to claim 1, further comprising:

a plurality of the audio collection units, wherein the plurality of the audio collection units are provided in the plurality of driven units, respectively.

7. A method for controlling an electronic device including a plurality of driven units, the method comprising:

detecting a failure that occurs in the plurality of driven units;

collating, when the failure is detected, audio collection data collected by an audio collection unit provided in the electronic device with failure audio data recording failure audio generated when the plurality of driven units are driven, and extracting a first candidate for a component that causes the failure;

specifying a component in a driven state immediately before the failure occurs based on correspondence data, the correspondence data associating an operation received by an operation unit provided in the electronic device with a component of the driven unit that is driven when the operation is received, and an operation history that is a history of the operation received by the operation unit, and extracting the specified component as a second candidate for the component that causes the failure; and setting a candidate for the component that causes the failure based on the component extracted as the first candidate and the component extracted as the second candidate.

8. An image forming apparatus comprising:

an audio collection unit;

an operation unit configured to receive an operation;

a plurality of driven units;

a storage unit configured to store correspondence data associating the operation received by the operation unit with a component of the driven unit that is driven when the operation is received, an operation history that is a history of the operation received by the operation unit, and failure audio data recording failure audio generated when the plurality of driven units are driven;

a failure detection unit configured to detect a failure that occurs in the plurality of driven units; and a candidate extraction unit configured to collate, when the failure detection unit detects the failure, audio collection data collected by the audio collection unit with the failure audio data, and extract a first candidate for a component that causes the failure, specify a component in a driven state immediately before the failure occurs based on the operation history and the correspondence data, and extract the specified component as a second candidate for the component that causes the failure, and set a candidate for the component that causes the failure based on the component extracted as the first candidate and the component extracted as the second candidate.

9. The image forming apparatus according to claim 8, wherein the audio collection unit is provided at a relay member disposed between a reading unit and a printing unit provided in the plurality of driven units.

* * * * *